US012659365B2

(12) United States Patent
Singh

(10) Patent No.: US 12,659,365 B2
(45) Date of Patent: Jun. 16, 2026

(54) SYSTEMS AND METHODS FOR ADDITIVE BITRATE FRAGMENTATION

(71) Applicant: Mixhalo Corp., San Francisco, CA (US)

(72) Inventor: Vikram Singh, San Francisco, CA (US)

(73) Assignee: Mixhalo Corp., San Francisco, CA (US)

( * ) Notice: Subject to any disclaimer, the term of this patent is extended or adjusted under 35 U.S.C. 154(b) by 0 days.

(21) Appl. No.: 18/491,906

(22) Filed: Oct. 23, 2023

(65) Prior Publication Data

US 2024/0163324 A1 May 16, 2024

Related U.S. Application Data

(60) Provisional application No. 63/425,343, filed on Nov. 15, 2022.

(51) Int. Cl.
*H04L 65/75* (2022.01)
(52) U.S. Cl.
CPC ................................... *H04L 65/75* (2022.05)
(58) Field of Classification Search
CPC ....... H04L 65/75; H04L 65/70; H04L 65/765; H04L 65/80
See application file for complete search history.

(56) References Cited

U.S. PATENT DOCUMENTS

| | | | |
|---|---|---|---|
| 10,911,762 B2* | 2/2021 | Mittal | H04N 19/172 |
| 11,489,938 B2 | 11/2022 | Cloud et al. | |
| 2018/0007362 A1* | 1/2018 | Krishnan | H04N 19/70 |
| 2021/0144394 A1* | 5/2021 | Cho | H04N 19/33 |
| 2023/0283789 A1* | 9/2023 | Shen | H04N 19/172 |
| | | | 375/240.26 |

OTHER PUBLICATIONS

Michael Waschbuesch, et al., Average Coding of Free-viewpoint Video in MPEG 4, 68 MPEG Meeting; Mar. 15, 2004-Mar. 19, 2004; Munchen; (Motion Picture Expert Group or ISO/IEC JTC1/SC29/WG11), No. M10581; m10581 Mar. 9, 2004, XPO30039412, Retrieved from the internet: URL:http.//phenix.int-evry.fr/mpeg/doc_end_user/documents/68_Muchen/contrib/m10581.zipm10581.doc[retrieved on Aug. 27, 2010.

* cited by examiner

*Primary Examiner* — Caroline H Jahnige
(74) *Attorney, Agent, or Firm* — Cesari and McKenna, LLP

(57) ABSTRACT

A method for real-time delivery of data based on additive bitrate fragmentation includes receiving a media sample by a server computing device and generating a key frame based on the media sample. The method also includes generating a differential frame based on the media sample and the key frame. The method also includes transmitting a first data packet including the key frame and a second data packet including the differential frame. The method also includes receiving the first data packet and the second data packet by a mobile computing device, generating the media sample based on the key frame and the differential frame, and initiating playback of the generated sample.

10 Claims, 5 Drawing Sheets

300

300

302   Receive a media sample

304   Generate a key frame based on the media sample

306   Generate a first differential frame based on the media sample and the key frame 308   Transmit a first data packet including the key frame 310   Transmit a second data packet including the first differential frame

500

Receive a first data packet including a key frame corresponding to a media sample

502

Receive a second data packet including a first differential frame corresponding to the media sample

504

Generate the media sample based on the key frame and the first differential frame

506

Initiate playback of the generated media sample

508

SYSTEMS AND METHODS FOR ADDITIVE BITRATE FRAGMENTATION

RELATED APPLICATION(S)

This application claims priority to U.S. Provisional Patent Application No. 63/425,343, filed on Nov. 15, 2022, the entirety of which is incorporated herein by reference.

FIELD OF THE INVENTION

This invention relates generally to the field of real-time delivery of data over wireless networks. More specifically, the invention relates to systems and methods for real-time delivery of data based on additive bitrate fragmentation.

BACKGROUND

The term "bitrate" refers to how quickly data travels across a network and is often used to describe a network's connection speed. Because it is a "rate" the higher the bitrate, the more information (and in the context of media, quality) can be shared with clients. Bitrate tends to have a correlative relationship to bandwidth, as the amount of available bandwidth will affect the bitrate that it makes sense to send media at. As network connectivity has increased, the wide variety of connection types and bandwidths have caused a need to optimize bitrate based on each individual client's available resources. This becomes exceedingly challenging in real-time, low latency environments when many clients are attempting to engage with media at the same time. Many of the existing bitrate algorithms have been designed with the assumption that either latency is not an issue or that some form of connectivity is guaranteed. However, in real-time low latency environments those assumptions cannot be made, making most bitrate algorithms ineffective in tackling the challenges associated with these environments.

SUMMARY

To overcome the above-identified challenges, the methods and systems described herein provide for real-time delivery of data based on additive bitrate fragmentation. For example, the systems and methods include techniques for generating a key frame based on a media sample, and a differential frame based on the media sample and the key frame. The systems and methods also include techniques for generating a media sample based on a key frame and a differential frame.

In one aspect, the invention includes a computerized method for real-time delivery of data based on additive bitrate fragmentation by a server computing device. The computerized method includes receiving a media sample. The computerized method also includes generating a key frame based on the media sample. The computerized method also includes generating a first differential frame based on the media sample and the key frame. The computerized method also includes transmitting a first data packet including the key frame. The computerized method also includes transmitting a second data packet including the first differential frame.

In some embodiments, the computerized method further includes generating a second differential frame based on the media sample and the key frame and transmitting a third data packet including the second differential frame. For example, in some embodiments, the computerized method further includes generating a third differential frame based on the media sample and the key frame and transmitting a fourth data packet including the third differential frame.

In other embodiments, the computerized method further includes generating a second differential frame based on the media sample, the key frame, and the first differential frame, and transmitting a third data packet including the second differential frame. For example, in some embodiments, the computerized method further includes generating a third differential frame based on the media sample, the key frame, the first differential frame, and the second differential frame, and transmitting a fourth data packet including the third differential frame.

In another aspect, the invention includes a system for real-time delivery of data based on additive bitrate fragmentation. The system includes a server computing device communicatively coupled to a mobile computing device over a network. The server computing device is configured to receive a media sample. The server computing device is also configured to generate a key frame based on the media sample. The server computing device is also configured to generate a first differential frame based on the media sample and the key frame. The server computing device is also configured to transmit a first data packet including the key frame. The server computing device is also configured to transmit a second data packet including the first differential frame.

In some embodiments, the server computing device is further configured to generate a second differential frame based on the media sample and the key frame and transmit a third data packet including the second differential frame. For example, in some embodiments, the server computing device is further configured to generate a third differential frame based on the media sample and the key frame and transmit a fourth data packet including the third differential frame.

In other embodiments, the server computing device is further configured to generate a second differential frame based on the media sample, the key frame, and the first differential frame, and transmit a third data packet including the second differential frame. For example, in some embodiments, the server computing device is further configured to generate a third differential frame based on the media sample, the key frame, the first differential frame, and the second differential frame, and transmit a fourth data packet including the third differential frame.

In another aspect, the invention includes a computerized method for real-time reception of data based on additive bitrate fragmentation by a mobile computing device. The computerized method includes receiving a first data packet including a key frame corresponding to a media sample. The computerized method also includes receiving a second data packet including a first differential frame corresponding to the media sample. The computerized method also includes generating the media sample based on the key frame and the first differential frame. The computerized method also includes initiating playback of the generated media sample.

In some embodiments, the computerized method further includes receiving a third data packet including a second differential frame corresponding to the media sample and generating the media sample based on the key frame and the second differential frame. For example, in some embodiments, the computerized method further includes receiving a fourth data packet including a third differential frame corresponding to the media sample and generating the media sample based on the key frame and the third differential frame.

In other embodiments, the computerized method further includes receiving a third data packet including a second differential frame corresponding to the media sample and generating the media sample based on the key frame, the first differential frame, and the second differential frame. For example, in some embodiments, the computerized method further includes receiving a fourth data packet including a third differential frame corresponding to the media sample and generating the media sample based on the key frame, the first differential frame, the second differential frame, and the third differential frame.

In another aspect, the invention includes a system for real-time reception of data based on additive bitrate fragmentation. The system includes a mobile computing device communicatively coupled to a server computing device over a network. The mobile computing device is configured to receive a first data packet including a key frame corresponding to a media sample. The mobile computing device is also configured to receive a second data packet including a first differential frame corresponding to the media sample. The mobile computing device is also configured to generate the media sample based on the key frame and the first differential frame. The mobile computing device is also configured to initiate playback of the generated media sample.

In some embodiments, the mobile computing device is further configured to receive a third data packet including a second differential frame corresponding to the media sample and generate the media sample based on the key frame and the second differential frame. For example, in some embodiments, the mobile computing device is further configured to receive a fourth data packet including a third differential frame corresponding to the media sample and generate the media sample based on the key frame and the third differential frame.

In other embodiments, the mobile computing device is further configured to receive a third data packet including a second differential frame corresponding to the media sample and generate the media sample based on the key frame, the first differential frame, and the second differential frame. For example, in some embodiments, the mobile computing device is further configured to receive a fourth data packet including a third differential frame corresponding to the media sample and generate the media sample based on the key frame, the first differential frame, the second differential frame, and the third differential frame.

These and other aspects of the invention will be more readily understood from the following descriptions of the invention, when taken in conjunction with the accompanying drawings and claims.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
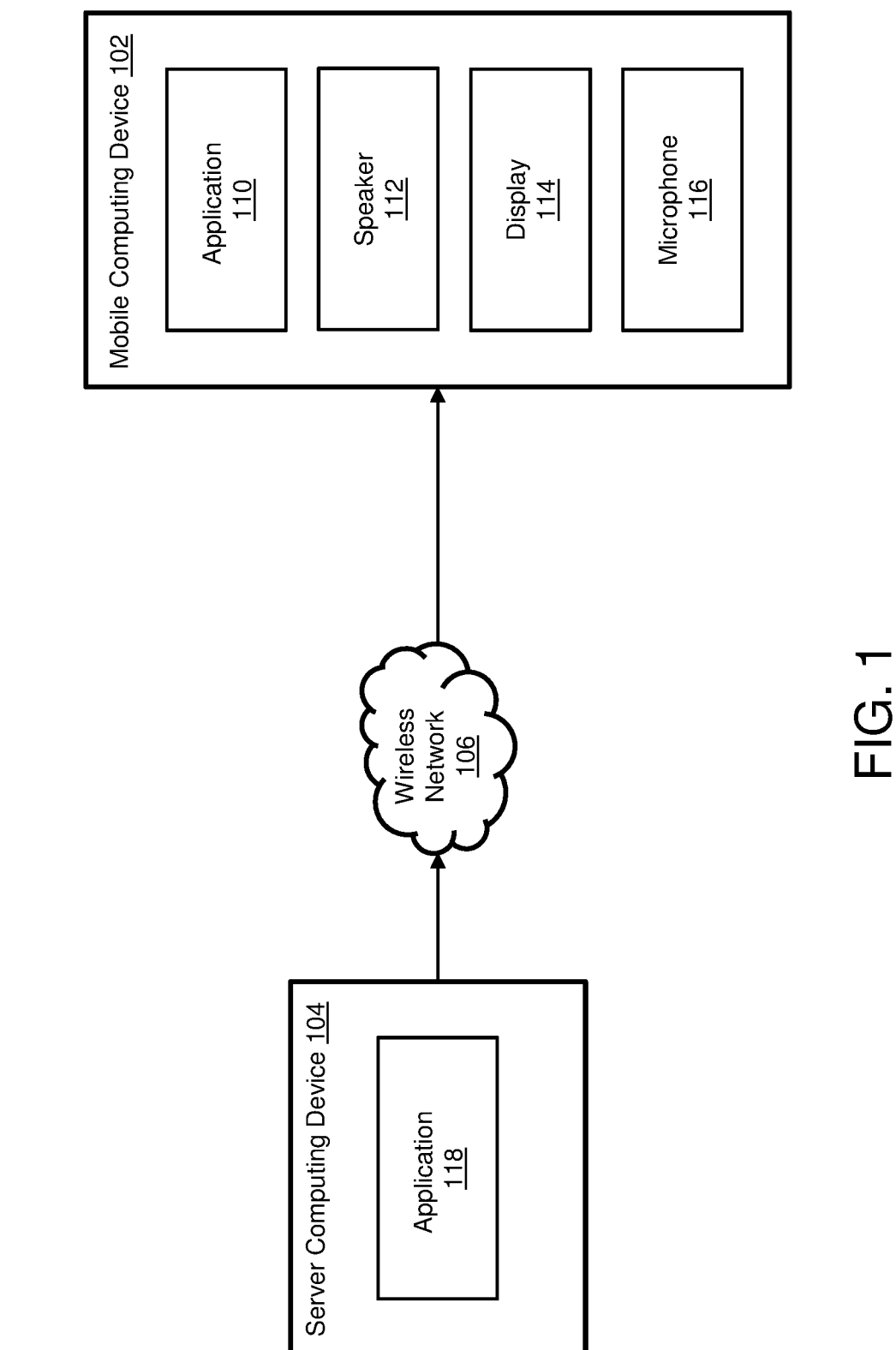
FIG. 1 is a schematic diagram of a system architecture for real-time delivery of data based on additive bitrate fragmentation, according to an illustrative embodiment of the invention.

Adaptive bitrate (ABR) streaming is a method for improving multimedia streaming over HTTP networks. In streaming, videos are segmented into smaller clips so clients do not need to wait for an entire media source to load before they can begin watching it.

ABR creates multiple versions of media files encoded to fit a variety of network conditions. Then by detecting a client's bandwidth and CPU capacity in real time, the media player can adjust the quality of the media stream accordingly between the respective, pre-encoded forms. It requires the use of an encoder which encodes a single source media at multiple bitrates. The player switches between streaming the different encodings depending on available resources. The result is reduced buffering, faster start times and an improved experience for both high-end and low-end connections.

ABR shines best when the bitrate and bandwidth differences between the encoded files are large, allowing the client a variety of options in order to best receive media. As a result, ABR is mostly found in the video realm, and not as prevalent in the audio realm as the bandwidth difference between different audio qualities is not as dramatic.

However, a limitation of ABR is that it relies on HTTP (and therefore TCP) in order to function. This also means ABR makes some assumptions that come along with the TCP protocol. For example, ABR doesn't really help address playback during a period of packet loss as it expects the TCP protocol to handle the re-transmission of the lost data. This means that while ABR can help limit the buffering of a video (by switching to a quality that best suits its available resources) it does it at the cost of latency as the client player and the server must be in constant, bi-directional communication. In low latency multimedia transmission, the overhead of ABR means it is not a viable way to improve performance.

Variable bitrate (VBR) streaming is a term used in telecommunications and computing that relates to the bitrate used in sound or video encoding. As opposed to constant bitrate (CBR), VBR files vary the amount of output data per time segment. VBR allows a higher bitrate (and therefore more storage space) to be allocated to the more complex segments of media files while less space is allocated to fewer complex segments. The average of these rates can be calculated to produce an average bitrate for the file.

The advantages of VBR are that it produces a better quality-to-space ratio compared to a CBR file of the same data. The bits available are used more flexibly to encode the sound or video data more accurately, with fewer bits used in less demanding passages and more bits used in difficult-to-encode passages.

There are a few limitations with VBR, specifically: (a) it may take more time to encode, as the process is more complex; and (b) some hardware might not be compatible with VBR files. Moreover, VBR takes a one size fits all approach by tackling the bitrate changes at the server side and producing a singular, bandwidth optimized data or stream without allowing the client to make any decisions based on its resource availability.

This brings us to a new technology known as additive bitrate fragmentation (ABF). While both ABR and VBR address the bandwidth issue utilizing different bitrates, they each have their own limitations which make them non-ideal for real-time media streams, especially at scale. The three key properties to maintain when creating a bitrate algorithm in this space are: (1) Latency—this goes without saying, but in a real-time environment increasing latency is the same as losing data—this means a bandwidth sensitive bitrate algorithm cannot trade off time for stability; (2) Loss resiliency—compounding of the first property, at scaled events the sheer amount of network traffic means there will be an inherent amount of loss, so this algorithm must perform in a lossy environment; and (3) Unidirectional communication (i.e. User Datagram Protocol (UDP))—in order to best achieve low latency at scale, unidirectional communication (such as UDP) is necessary—this means the algorithm must be able to work without a talkback channel to the server.

In this particular environment, ABF tackles the issue by taking a media sample, breaking the sample up into key and differential frames, and transmitting those frames in separate packets. This allows a client to only need to receive the key frame in order to play media, giving the client optionality regarding the additive frames, either adding them to the key frame for higher quality or discarding in order to make up for latency. In doing so, not only does ABF exceed in 1-to-1 communication frameworks (such as unicast), but also exceed in 1-to-many frameworks as the key frame and its differential frames are available to all clients listening to the same type of media and allowing the individual client to make decisions based on their specific scenarios.

For the purpose of an example, ABF takes an audio sample and encodes the sample to a specific quality level as the key frame, for example, 64 kilobits per second (kbps). Next, ABF creates the differential frames which can be added to the key frame to increase quality. What is unique in this technique (and markedly different from an adaptive bitrate solution) is that instead of transmitting the entire higher quality frame (for example, 128 kbps), ABF takes the higher quality frame and subtracts all the data present in the key frame before sending. This has two primary benefits: (1) the new frame being sent is significantly smaller from a bandwidth/data perspective—in an at-scale environment, being bandwidth light is crucial; and (2) the new frame is not needed—if this frame is lost in a noisy environment due to packet loss or latency, it does not affect the playback of the media.

The creation of the key frame and differential frames happens server-side while the client player can receive the key frames and decide whether to add the differential frames based on how the client device is performing (which is a specific client resource-driven decision).

Due to the low bandwidth nature of the frame separation in ABF, a multitude of quality levels can be created by adding additional differential frames, for example, key frame—64 kbps, differential frames—96 kbps, 128 kbps, 192 kbps, 320 kbps. The ABF algorithm can also create these frames in a stand-alone or sequenced fashion (depending on the environment it is being deployed in). In the stand-alone fashion, each differential frame is created using the key frame. This allows the client player to perform a single additive operation in order to get the desired quality, at the cost of utilizing additional bandwidth.

key frame: 64 kbps
diff 1 frame: 128 kbps–64 kbps
diff 2 frame: 192 kbps–64 kbps
diff 3 frame: 320 kbps–64 kbps In the sequential mode, the differential frames are much smaller, but must all be received in order to achieve complete quality. In this scenario, each differential frame is smaller, but due to the additive nature of the format, if all frames are received full quality can be achieved.

key frame: 64 kbps
diff 1 frame: 128 kbps–64 kbps
diff 2 frame: 192 kbps–128 kbps
diff 3 frame: 320 kbps–192 kbps FIG. 1 is a schematic diagram of a system architecture 100 for real-time delivery of data based on additive bitrate fragmentation, according to an illustrative embodiment of the invention. System 100 includes a mobile computing device 102 communicatively coupled to a server computing device 104 over a wireless network 106. Mobile computing device 102 includes an application 110, one or more speakers 112, a display 114, and one of more microphones 116. Server computing device 104 includes an application 118. In some embodiments, the server computing device 104 is communicatively coupled to an audio interface (not shown).

Figure 2:
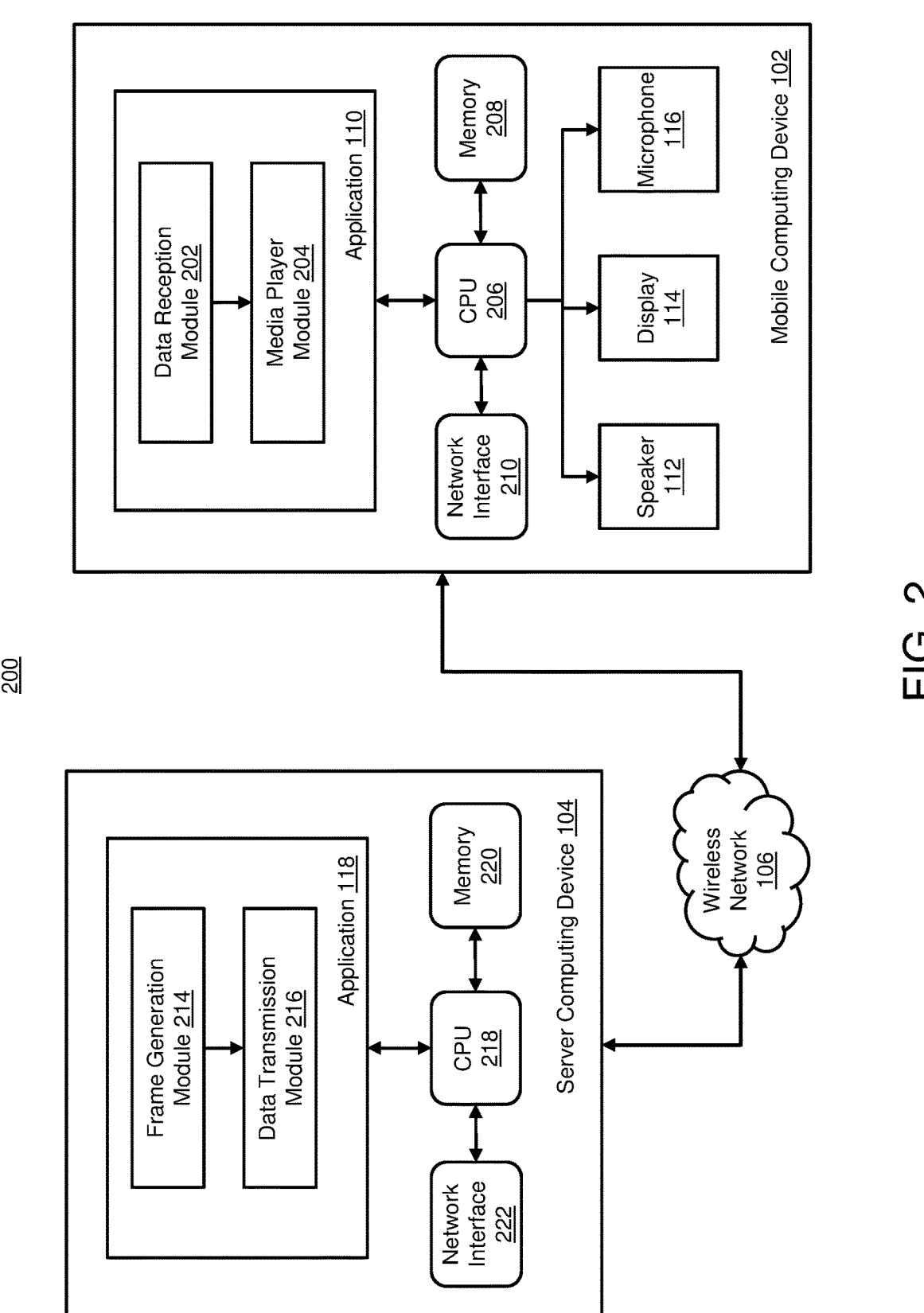
FIG. 2 is a detailed schematic diagram of a system architecture for real-time delivery of data based on additive bitrate fragmentation, according to an illustrative embodiment of the invention.

FIG. 2 is a detailed schematic diagram of a system architecture 200 for real-time delivery of data based on additive bitrate fragmentation, according to an illustrative embodiment of the invention. In addition to the components described above with respect to FIG. 1, application 110 includes a data reception module 202 that is configured to receive data packets including a key frame and differential frame(s) corresponding to a media sample from server computing device 104 via wireless network 106. Application 110 also includes a media player module 204 that is configured to process the data packets as described herein to generate the media sample and initiate playback of the media sample. FIG. 2 also illustrates CPU 206, memory 208, and network interface 210 of mobile computing device 102. Generally, modules 202, 204 are specialized sets of computer software instructions which execute on one or more processors of mobile computing device 106 (e.g., CPU 206). In some embodiments, modules 202, 204 can specify designated memory locations and/or registers for executing the specialized computer software instructions.

Exemplary mobile computing devices 102 include, but are not limited to, tablets and smartphones, such as Apple® iPhone®, iPad® and other iOS®-based devices, and Samsung® Galaxy®, Galaxy Tab™ and other Android™-based devices. It should be appreciated that other types of computing devices capable of connecting to and/or interacting with the components of system 100 can be used without departing from the scope of invention. Although FIG. 1 depicts a single mobile computing device 102, it should be appreciated that system 100 can include a plurality of mobile computing devices. An exemplary application 110 can be an app downloaded to and installed on the mobile computing device 102 via, e.g., the Apple® App Store or the Google® Play Store. The user can launch application 110 on the mobile computing device 102 and interact with one or more user interface elements displayed by the application 110 on a screen of the mobile computing device 102 to begin receiving data from server computing device 104.

In addition to the components described above with respect to FIG. 1, application 118 includes a frame generation module 214 that is configured to generate a key frame and differential frame(s) corresponding to a media sample. Application 118 also includes a data transmission module 216 that is configured to generate data packets based on the key frame and differential frame(s) and transmit the data packets to mobile computing device 102 via wireless network 106. FIG. 2 also illustrates CPU 218, memory 220, and network interface 222 of server computing device 104. Generally, modules 214, 216 are specialized sets of computer software instructions which execute on one or more processors of server computing device 104 (e.g., CPU 218). In some embodiments, modules 214, 216 can specify designated memory locations and/or registers for executing the specialized computer software instructions.

Figure 3:
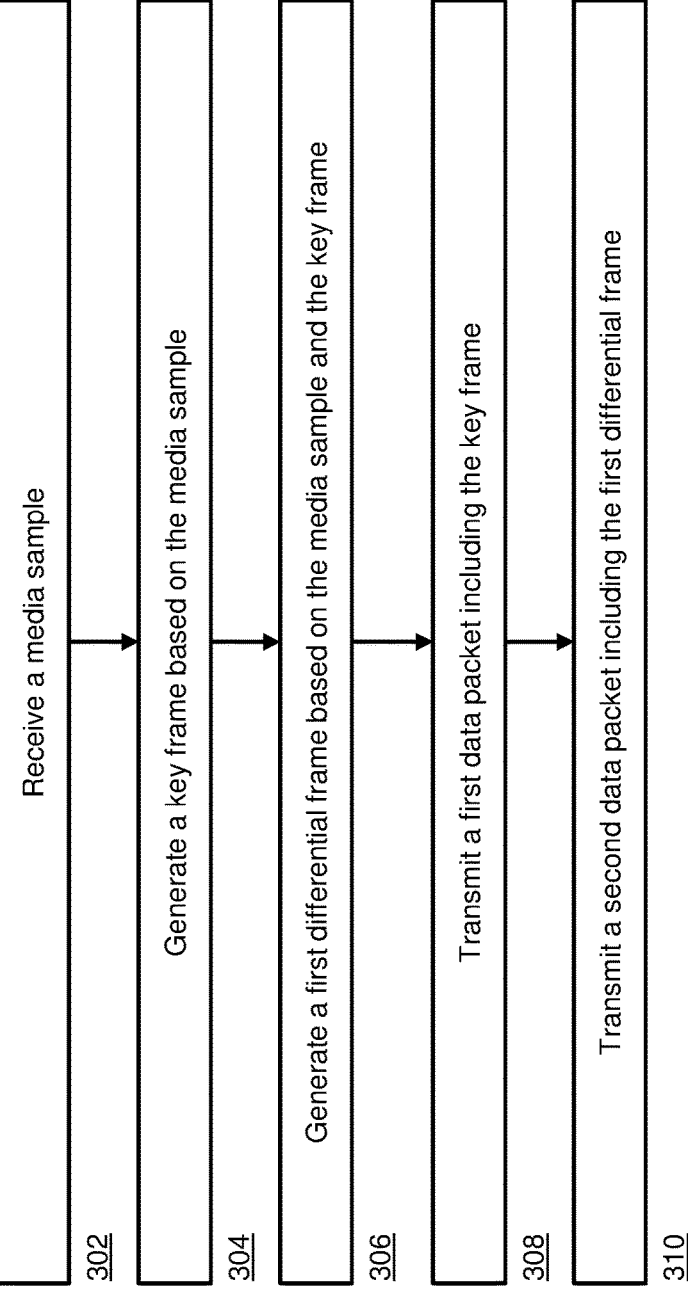
FIG. 3 is a schematic flow diagram illustrating real-time delivery of data based on additive bitrate fragmentation using the system architecture of FIG. 1 and FIG. 2, according to an illustrative embodiment of the invention.

FIG. 3 is a schematic flow diagram of a process 300 illustrating real-time delivery of data based on additive bitrate fragmentation using system architecture 100/200, according to an illustrative embodiment of the invention. Process 300 begins by receiving, by a server computing device 104, a media sample at step 302. In some embodiments, the media sample corresponds to a data representation of a live audio signal associated with a live event (e.g., concert, sporting event, etc.). In these embodiments, server computing device 104 can receive the media sample as, e.g., a data stream from an audio interface such as another computing device and/or a soundboard at the live event.

Process 300 continues by generating, by the server computing device 104, a key frame based on the media sample at step 304. In some embodiments, frame generation module 214 of server computing device 104 generates the key frame from the media sample by encoding the sample to a specific quality level, for example, 64 kilobits per second (kbps).

Figure 4:
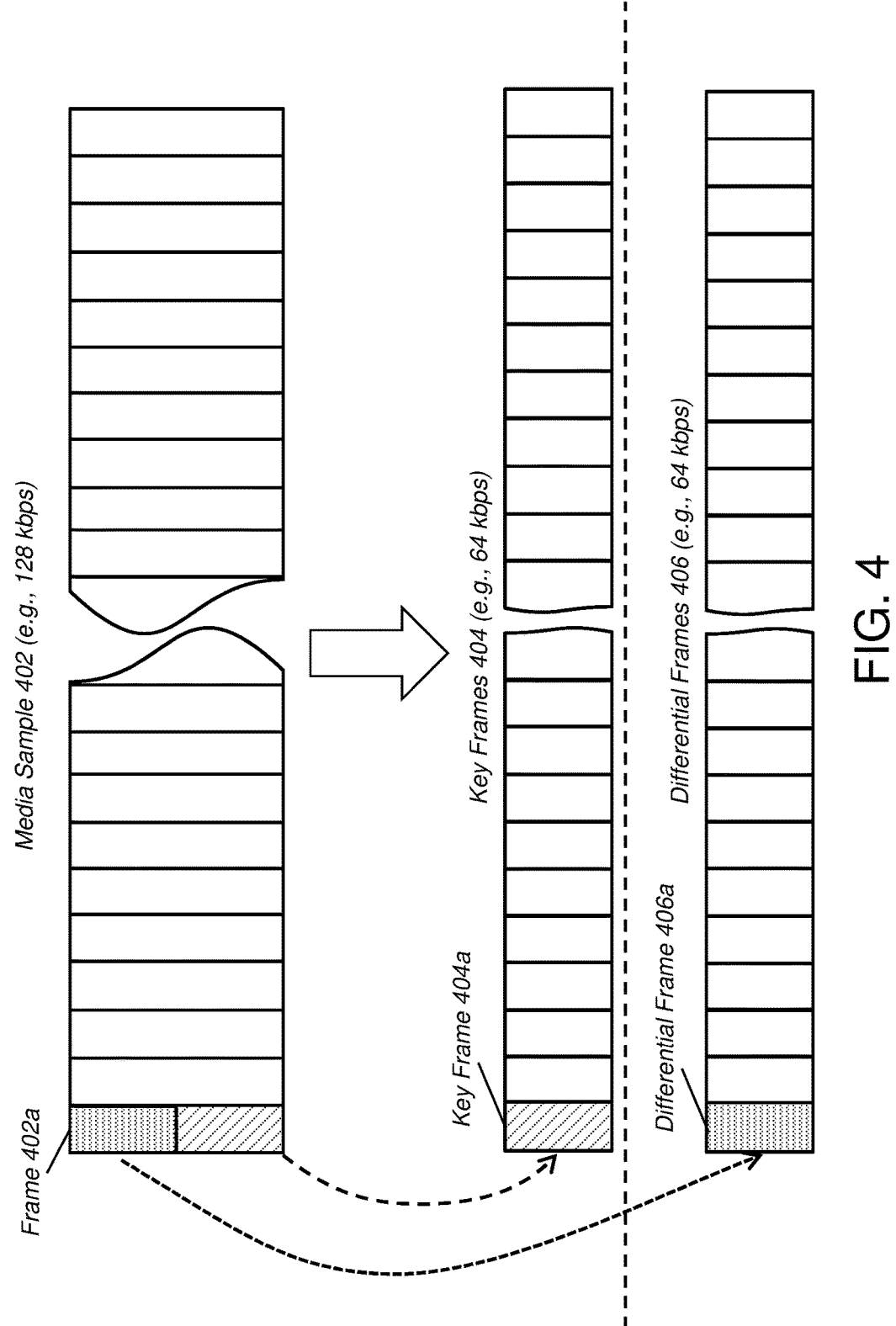
FIG. 4 is a diagram illustrating the generation of key frames and differential frames from a media sample, according to an illustrative embodiment of the invention

Process 300 continues by generating, by the server computing device 104, a first differential frame based on the media sample and the key frame at step 306. For example, in some embodiments frame generation module 214 subtracts the data in the key frame from a higher quality frame (e.g., 128 kbps) to generate a differential frame. FIG. 4 is a diagram illustrating the generation of key frames 404 and differential frames 406 from a media sample 402, according to an illustrative embodiment of the invention. As shown in FIG. 4, the data from frame 402a in media sample 402 (which is 128 kbps) is encoded as key frame 404a at 64 kbps. Then, the data of key frame 404a is subtracted from media sample frame 402a to generate differential frame 406a.

Process 300 continues by transmitting, by the server computing device 104, a first data packet including the key frame at step 308. For example, in some embodiments data transmission module 216 generates a first data packet comprising the key frame and transmits the first data packet to mobile computing device 102 via network interface 222 and wireless network 106.

Process 300 finishes by transmitting, by the server computing device 104, a second data packet including the first differential frame at step 310. Similarly, data transmission module 216 generates a second data packet comprising the first differential frame (e.g., 128 kbps higher quality frame— 64 kbps of key frame data) and transmits the second data packet to mobile computing device 102 via network interface 222 and wireless network 106.

In some embodiments, process 300 further continues by generating, by the server computing device 104, a second differential frame based on the media sample and the key frame and transmitting a third data packet including the second differential frame. As described above, frame generation module 214 can generate a second differential frame by subtracting the data in the key frame from a higher quality frame (e.g., 192 kbps–64 kbps). Then, data transmission module 216 can generate a third data packet comprising the second differential frame and transmit the third data packet to mobile computing device 102 via network interface 222 and wireless network 106.

In some embodiments, process 300 further continues by generating, by the server computing device 104, a third differential frame based on the media sample and the key frame and transmitting a fourth data packet including the third differential frame. As described above, frame generation module 214 can generate a third differential frame by subtracting the data in the key frame from a higher quality frame (e.g., 320 kbps–64 kbps). Then, data transmission module 216 can generate a fourth data packet comprising the third differential frame and transmit the fourth data packet to mobile computing device 102 via network interface 222 and wireless network 106.

In other embodiments, process 300 further continues by generating, by the server computing device 104, a second differential frame based on the media sample, the key frame, and the first differential frame, and transmitting a third data packet including the second differential frame. As described above, frame generation module 214 can generate a second differential frame by subtracting the data in the key frame and the data in the first differential frame from a higher quality frame (e.g., 192 kbps–64 kbps–64 kbps). Then, data transmission module 216 can generate a third data packet comprising the second differential frame and transmit the third data packet to mobile computing device 102 via network interface 222 and wireless network 106.

In some embodiments, process 300 further continues by generating, by the server computing device 104, a third differential frame based on the media sample, the key frame, the first differential frame, and the second differential frame, and transmitting a fourth data packet including the third differential frame. As described above, frame generation module 214 can generate a third differential frame by subtracting the data in the key frame, the data in the first differential frame, and the data in the second differential frame from a higher quality frame (e.g., 320 kbps–64 kbps–64 kbps). Then, data transmission module 216 can generate a fourth data packet comprising the third differential frame and transmit the fourth data packet to mobile computing device 102 via network interface 222 and wireless network 106.

Figure 5:
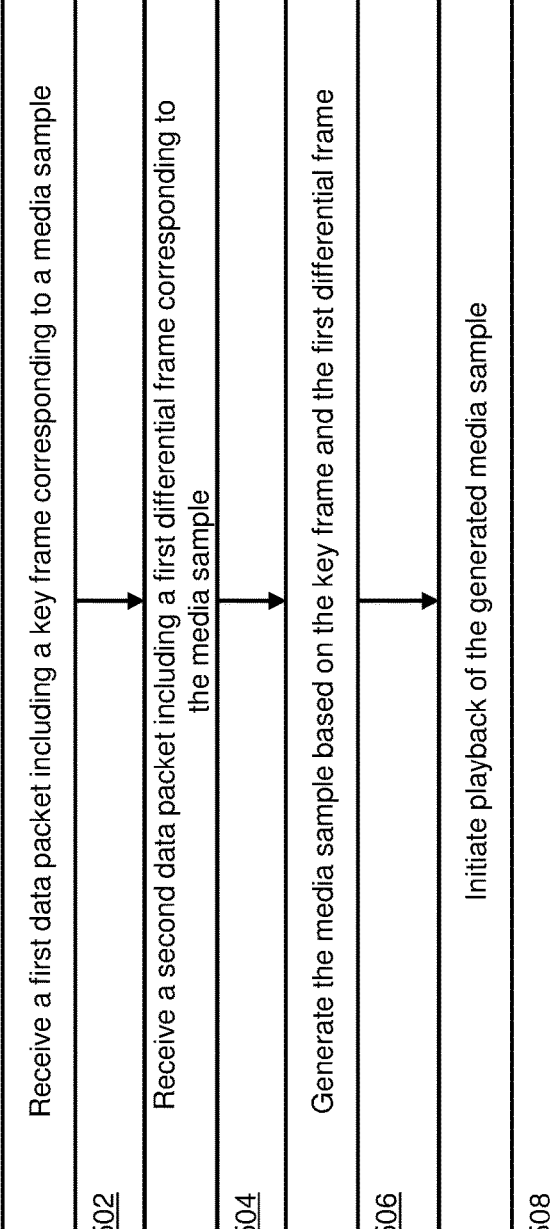
FIG. 5 is a schematic flow diagram illustrating real-time reception of data based on additive bitrate fragmentation using the system architecture of FIG. 1 and FIG. 2, according to an illustrative embodiment of the invention.

FIG. 5 is a schematic flow diagram 500 illustrating real-time reception of data based on additive bitrate fragmentation using system architecture 100/200, according to an illustrative embodiment of the invention. Process 500 begins by receiving, by a mobile computing device 102, a first data packet including a key frame corresponding to a media sample at step 502. Process 500 continues by receiving, by the mobile computing device 102, a second data packet including a first differential frame corresponding to the media sample at step 504. For example, data reception module 202 of mobile computing device 102 receives the first data packet and the second data packet from server computing device 104 via wireless network 106 and network interface 210.

Process 500 continues by generating, by the mobile computing device 102, the media sample based on the key frame and the first differential frame at step 506. Process 500 finishes by initiating, by the mobile computing device 102, playback of the generated media sample at step 508. For example, media player module 204 of mobile computing device 102 processes the key frame and the first differential frame to reconstruct the media sample—as described above, media player module 204 can receive the key frames and decide whether to add the differential frame(s) based on, e.g., performance considerations.

In some embodiments, process 500 further continues by receiving, by the mobile computing device 102, a third data packet including a second differential frame corresponding to the media sample and generating the media sample based on the key frame and the second differential frame. For example, in some embodiments, process 500 further continues by receiving, by the mobile computing device 102, a fourth data packet including a third differential frame corresponding to the media sample and generating the media sample based on the key frame and the third differential frame.

In other embodiments, process 500 further continues by receiving, by the mobile computing device 102, a third data packet including a second differential frame corresponding to the media sample and generating the media sample based on the key frame, the first differential frame, and the second differential frame. For example, in some embodiments, process 500 further continues by receiving, by the mobile computing device 102, a fourth data packet including a third differential frame corresponding to the media sample and generating the media sample based on the key frame, the first differential frame, the second differential frame, and the third differential frame.

The systems and methods described herein provide a novel way to tackle the challenges of a real-time, at-scale environment where media is being present to many clients simultaneously. The systems and methods described herein excel in providing the client player the ability to utilize bitrate as a variable to balance media quality vs media latency, while not eating up additional bandwidth in the environment.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM® Cloud).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD™, HD-DVD™, and Blu-ray™ disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth®, near field communications (NFC) network, Wi-Fi™, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Edge™ available from Microsoft Corporation, and/or Mozilla® Firefox available from Mozilla Corporation). Mobile computing device include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The systems and methods described herein can be implemented using supervised learning and/or machine learning algorithms. Supervised learning is the machine learning task of learning a function that maps an input to an output based on example of input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

While the invention has been particularly shown and described with reference to specific preferred embodiments, it should be understood by those skilled in the art that various changes in form and detail may be made therein without departing from the spirit and scope of the invention as defined by the following claims.

The invention claimed is:

1. A computerized method for real-time delivery of data based on additive bitrate fragmentation, the method comprising:

receiving, by a server computing device, a media sample encoded to a first quality level;

generating, by the server computing device, a key frame based on the media sample, the key frame encoded to a second quality level;

generating, by the server computing device, a first differential frame based on the media sample and the key frame by subtracting a first amount of data present in the key frame from the media sample;

transmitting, by the server computing device, a first data packet comprising the key frame to one or more client computing devices via a User Datagram Protocol (UDP)-configured network connection; and transmitting, by the server computing device, a second data packet comprising the first differential frame to the one or more client computing devices via the UDP-configured network connection.

2. The method of claim 1, wherein the server computing device is further configured to:

generate a second differential frame based on the media sample and the key frame by subtracting a second amount of data present in the key frame from the media sample; and transmit a third data packet comprising the second differential frame to the one or more client computing devices via the UDP-configured network connection.

3. The method of claim 2, wherein the server computing device is further configured to:

generate a third differential frame based on the media sample and the key frame by subtracting a third amount of data present in the key frame from the media sample; and transmit a fourth data packet comprising the third differential frame to the one or more client computing devices via the UDP-configured network connection.

4. The method of claim 1, wherein the server computing device is further configured to:

generate a second differential frame based on the media sample, the key frame, and the first differential frame by subtracting the first amount of data present in the key frame from the media sample and subtracting a second amount of data present in the first differential frame from the media sample; and transmit a third data packet comprising the second differential frame to the one or more client computing devices via the UDP-configured network connection.

5. The method of claim 4, wherein the server computing device is further configured to:

generate a third differential frame based on the media sample, the key frame, the first differential frame, and the second differential frame by subtracting the first amount of data present in the key frame from the media sample, subtracting a second amount of data present in the first differential frame from the media sample, and subtracting a third amount of data present in the second differential frame from the media sample; and transmit a fourth data packet comprising the third differential frame to the one or more client computing devices via the UDP-configured network connection.

6. A system for real-time delivery of data based on additive bitrate fragmentation, the system comprising:

a server computing device communicatively coupled to a mobile computing device over a network, the server computing device configured to:

receive a media sample encoded to a first quality level;

generate a key frame based on the media sample, the key frame encoded to a second quality level;

generate a first differential frame based on the media sample and the key frame by subtracting a first amount of data present in the key frame from the media sample;

transmit a first data packet comprising the key frame to one or more client computing devices via a User Datagram Protocol (UDP)-configured network connection; and transmit a second data packet comprising the first differential frame to the one or more client computing devices via the UDP-configured network connection.

7. The system of claim 6, wherein the server computing device is further configured to:

generate a second differential frame based on the media sample and the key frame by subtracting a second amount of data present in the key frame from the media sample; and transmit a third data packet comprising the second differential frame to the one or more client computing devices via the UDP-configured network connection.

8. The system of claim 7, wherein the server computing device is further configured to:

generate a third differential frame based on the media sample and the key frame by subtracting a third amount of data present in the key frame from the media sample; and transmit a fourth data packet comprising the third differential frame to the one or more client computing devices via the UDP-configured network connection.

9. The system of claim 6, wherein the server computing device is further configured to:

generate a second differential frame based on the media sample, the key frame, and the first differential frame by subtracting the first amount of data present in the key frame from the media sample and subtracting a second amount of data present in the first differential frame from the media sample; and transmit a third data packet comprising the second differential frame to the one or more client computing devices via the UDP-configured network connection.

10. The system of claim 9, wherein the server computing device is further configured to:

generate a third differential frame based on the media sample, the key frame, the first differential frame, and the second differential frame by subtracting the first amount of data present in the key frame from the media sample, subtracting a second amount of data present in the first differential frame from the media sample, and subtracting a third amount of data present in the second differential frame from the media sample; and transmit a fourth data packet comprising the third differential frame to the one or more client computing devices via the UDP-configured network connection.

* * * * *